United States Patent Office 3,264,176
Patented August 2, 1966

3,264,176
ULTRAVIOLET LIGHT STABLE SYNERGISTIC PYRETHRUM COMPOSITIONS
Arthur Rapport, Glencoe, Ill., assignor to Leeco Chemical Company Division of Leeco Gas and Oil Co., Miami Beach, Fla., a corporation of Florida
No Drawing. Filed Feb. 11, 1963, Ser. No. 257,790
5 Claims. (Cl. 167—24)

This invention relates, in general, to insecticidal compositions. More particularly it relates to novel pyrethrum compositions which have increased lifespans in environments where ultraviolet light is present.

Those concerned with insect control are familiar with the extremely high toxicity of pyrethrum and its value as an insecticide. However, when exposed to ultraviolet light, pyrethrum dimerizes or in some other manner not completely understood loses its effectiveness as an insecticide. Its tendency to become inactive upon exposure to ultraviolet light and its expense which is high as insecticides go have discouraged its use in many areas where its fine insecticidal qualities could have been used extensively.

One of the objects of this invention is to provide and prepare novel pyrethrum containing insecticidal compositions which have lifespans, upon exposure to ultraviolet light, of substantially greater duration than known pyrethrum containing insecticidal compositions.

Another object of this invention is to provide a prepare novel insecticidal compositions including an insecticidal component having a minor proportion of pyrethrum and a major proportion of a member selected from the group consisting of piperonyl butoxide, Sesoxane, Sulfoxide and MGK 264; and further including a substrate component, upon which the insecticidal component has been adsorbed, selected from the group including activated charcoal, porous sodium aluminum silicate, and porous magnesium silicate.

Other objects and advantages will become apparent from the following description of this invention.

As used in the specification and claims hereof, the word *insect*, unless otherwise indicated, means insects in any stage of development, including eggs, larvae, pupae, and adults, as well as spiders, ticks, mites, scorpions and other insect-like classes of arthropods. Also as used in the specification and claims hereof, the word *adsorb* denotes adsorption in the true technical sense as well as encompassing other mechanisms whereby the insecticidal component is caused to adhere to or to be carried by or upon the substrate component. The names Sesoxane, Sulfoxide and MGK 264 are all trade names. Sesoxane denotes a trade name of Shulton, Inc., and is described as 2-(3,4-methylene dioxy phenoxy)-3,6,9-trioxaundecane; Sulfoxide, a trade name of S. B. Penick & Co., is the n-octylsulfoxide of isosafrol; and MGK 264, a trade name of McLaughlin Gormley King Co. is N-octyl bicycloheptene dicarboximide. For purposes of brevity the trade names, rather than the chemical names, of those components will be used throughout the specification and claims hereof. Also, as is conventional in the insecticide art, the term "pyrethrum" is used in the specification and in the claims to encompass the pyrethrins, the active components of pyrethrum flower, as well as pyrethrum flower which is a mixture of the pyrethrins as they occur in their natural state.

It has been discovered that when pyrethrum containing insecticides are adsorbed upon certain substrates, the resulting compositions are resistant to degradation by ultraviolet light. That was a totally unexpected phenomenon in view of the fact that pyrethrum had been diluted with and carried upon various powdered and finely divided carriers and extenders in the past and none of the known pyrethrum containing compositions had exhibited the ultraviolet light resistance of the compositions of this invention. The mechanism whereby the compositions of this invention achieve their novel and unexpected results is not known or understood, although it may be possible that the substrates used in accordance with this invention react in some manner with a portion of the pyrethrum molecules thereby making the pyrethrum molecules more stable and less likely to dimerize in the presence of ultraviolet light. It has been the tendency of known pyrethrum containing compositions to dimerize or otherwise lose their insecticidal activity when exposed to ultraviolet light.

More particularly it has been discovered that when a minor proportion of pyrethrum, by weight, and a major proportion of a member selected from the group consisting of piperonyl butoxide, Sesoxane, Sulfoxide and MGK 264 are adsorbed upon a substrate selected from the group including activated charcoal, powdered porous sodium aluminum silicate and powdered porous magnesium silicate, if the resulting composition is present in a quantity sufficient to have insecticidal activity without exposure to ultraviolet light, then prolonged exposure of the composition to ultraviolet light will not destroy its insecticidal activity with the rapidity that the insecticidal activity of known pyrethrum compositions are destroyed when exposed to ultraviolet light.

Compositions embodying this invention may be prepared in a number of ways. In accordance with one of them, a composition exemplary of this invention was prepared as follows.

EXAMPLE I

In about 500 milliliters of water, 14 grams of Norit N, an activated charcoal manufactured by American Norit Co., Inc., were suspended and mixed thoroughly while being heated to a temperature of about 40° C. At that point 4.0 grams of piperonyl butoxide and 2.0 grams of a 20% pyrethrum solution in deodorized kerosene (0.4 gram pyrethrum) was added and the suspension stirred for a period of fifteen minutes at about 40° C. The solids were filtered and then allowed to dry in air. That composition was then diluted with pyrophyllite, aluminum silicate monohydrate ($Al_2O_3 \cdot 4SiO_2 \cdot H_2O$), a commonly used insecticide diluent and carrier, to a concentration of 0.2% pyrethrum and 2.0% piperonyl butoxide. (Here, as elsewhere herein, where percentages of the constituents are given they refer to percentages by weight.)

Then that diluted composition was evaluated to determine its insecticidal activity in accordance with a test standard in the insecticide industry for evaluating the insecticidal activity of various materials. The steps of that test are as follows:

(1) Spread 25 mg. of the composition to be tested evenly and uniformly in a three inch diameter petri dish;

(2) Place twenty, four- to five-day old female flies in the petri dish and cover it for one (1) hour;

(3) Remove the flies and place them in a recovery dish;

(4) Count those that do not recover within a period of 24 hours as dead and calculate the percentage killed;

(5) Repeat the foregoing steps a number of times with a new batch of flies and average the results.

To determine the resistance of the composition to ultraviolet light an additional step, that of exposing the evenly spread composition in the petri dish to ultraviolet light (following step 1) for a predetermined period *prior* to the introduction of the flies (prior to step 2) was performed. The source of ultraviolet light used was of an intensity which made a period of exposure of 24 hours equivalent to about one month's exposure to the sun at mid-day during July at a latitude of 42°. The periods of exposure set forth in the specification throughout contemplate exposures of that degree of intensity.

In the case of the illustrative composition prepared in accordance with Example I, prior to exposure to ultraviolet light, the composition consistently killed 100% of the flies exposed to it. After exposure to ultraviolet light for periods of up to 48 hours, the composition killed 98%, substantially all of the flies exposed to it. However a formulation of pyrethrum and piperonyl butoxide when adsorbed in the ratio of 2% pyrethrum (from a 20% pyrethrum solution) and 10% piperonyl butoxide on 80% pyrophyllite, all by weight, and further diluted to 0.2% pyrethrum and 1.0% piperonyl butoxide with additional pyrophyllite, when exposed to ultraviolet light for 24 hours in accordance with the foregoing test exhibited only a 2% kill although prior to exposure to ultraviolet light it killed 100% of the flies exposed to it.

Those comparative tests illustrate the effectiveness and the ultraviolet light resistance of one of the compositions formulated in accordance with this invention.

When adsorption is carried out in an aqueous medium, as was described in connection with Example I, it may be desirable to add minor quantities of wetting or other surface active agents to the mixture. To that end a number of formulations were prepared using minor proportions of Atlox 3403, Atlox 3404, and Atlox 4500, products of Atlas Chemical Industries, Inc., all comprising surface active agents of the alkyl aryl sulfonate and polyether types. The use of a surface active agent is a desirable, but not a necessary, adjunct of this invention. The amounts or types used are not critical. However, where they were used in preparing compositions embodying this invention, their presence will be indicated in Table I which follows, in the proportions in which they were used.

Table I identifies a number of specific compositions containing pyrethrum, piperonyl butoxide and activated charcoal, which were prepared in the same general manner described in Example I and tabulates the relative effectiveness of each after exposure to ultraviolet light. Also indicated in the table are the diluents, such as pyrophyllite and clay of the kaolin type, used to extend the insecticidal compositions prepared in accordance with this invention. Where "N" appears that indicates Norit N was the activated charcoal used. Where "G" appears that indicates that G–60, a designation for an activated charcoal manufactured by Atlas Chemical Industries, Inc., from vegetable sources and having a carbon content of about 85%, somewhat higher than Norit N, was the activated charcoal used. In tabulating the ingredients in Table I, the total adds up to less than 100% because the pyrethrum was introduced in a 20% solution. If that is considered, it will be found that the ingredients do add up to 100%.

It should be noted that in each case, without exposure to ultraviolet light the compositions listed in Table I exhibited a 100% kill. It should also be noted that when adsorbed upon pyrophyllite, and diluted with additional pyrophyllite, a pyrethrum-piperonyl butoxide composition containing 0.2% pyrethrum and 1.0% piperonyl butoxide exhibited only a 2% kill *after* a 24-hour exposure to ultraviolet light, while other compositions containing Sesoxane, Sulfoxide, and MGK #264 instead of piperonyl butoxide when mixed with pyrethrum and adsorbed on pyrophyllite and further diluted with pyrophyllite to a final pyrethrum concentration of about 0.2% to about 1.0% of Sesoxane, Sulfoxide and MGK 264, exhibited kills of 0%, 2% and 0% respectively. All however displayed 100% effectiveness prior to exposure to ultraviolet light. It is to be understood that all tests evaluating the compositions were carried out according to the procedure set forth earlier.

*Table I*

| Original Proportions Introduced Into Water | | | | Diluent Used | Final Concentration, Percent | | Effectiveness | |
|---|---|---|---|---|---|---|---|---|
| Percent Pyrethrum (In a 20% Solution) | Percent Piperonyl Butoxide | Percent Charcoal | Wetting Agent (10% Where Used) | | Pyrethrum | Piperonyl Butoxide | Hours of Exposure to Ultraviolet Light* | Percent Kill After Exposure to Ultraviolet Light |
| 0.4 | 2.0 | 96 N | None | None | 0.4 | 2.0 | 16 | 100 |
| 0.4 | 2.0 | 96 N | None | ___do___ | 0.4 | 2.0 | 48 | 100 |
| 0.4 | 2.0 | 96 N | None | ___do___ | 0.4 | 2.0 | 72 | 97 |
| 2.0 | 20 | 70 N | None | Pyrophyllite | 0.2 | 2.0 | 16 | 75 |
| 2.0 | 20 | 70 N | None | ___do___ | 0.2 | 2.0 | 16 | 100 |
| 2.0 | 20 | 70 N | None | ___do___ | 0.2 | 2.0 | 48 | 98 |
| 2.0 | 20 | 60 N | 3403 | ___do___ | 0.2 | 2.0 | 16 | 90 |
| 2.0 | 20 | 60 N | 3403 | ___do___ | 0.2 | 2.0 | 16 | 100 |
| 2.0 | 20 | 60 N | 3403 | ___do___ | 0.2 | 2.0 | 24 | 100 |
| 2.0 | 20 | 60 N | 3403 | ___do___ | 0.2 | 2.0 | 48 | 100 |
| 2.0 | 20 | 60 G | 3404 | ___do___ | 0.2 | 2.0 | 16 | 90 |
| 2.0 | 20 | 60 G | 4500 | ___do___ | 0.2 | 2.0 | 16 | 100 |
| 2.0 | 20 | 60 G | 4500 | ___do___ | 0.2 | 2.0 | 24 | 100 |
| 2.5 | 25 | 52.5 G | 3404 | ___do___ | 0.2 | 2.5 | 16 | 100 |
| 2.5 | 25 | 52.5 N | None | Clay | 0.2 | 2.5 | 24 | 100 |
| 5.0 | 50 | 15 N | 3404 | Pyrophyllite | 0.2 | 2.0 | 16 | 83 |
| 2.0 | 20 | 70 N | None | ___do___ | 0.1 | 1.0 | 16 | 63 |
| 2.0 | 20 | 60 G | 4500 | ___do___ | 0.1 | 1.0 | 16 | 73 |
| 2.0 | 20 | 60 G | 4500 | ___do___ | 0.1 | 1.0 | 16 | 83 |
| 2.0 | 20 | 60 N | 3403 | ___do___ | 0.1 | 1.0 | 16 | 100 |
| 2.0 | 20 | 60 N | 3403 | ___do___ | 0.1 | 1.0 | 48 | 90 |
| 2.5 | 25 | 52.5 G | 3404 | ___do___ | 0.1 | 1.0 | 16 | 90 |

*24 hours are equivalent to about 1 month of mid-day, mid-July sun at a latitude of 42°.

Another suitable method for preparing compositions exemplary of this invention comprises the use of pentane as the medium in which the pyrethrum and the other active ingredients are intermixed with the substrate component and adsorbed thereupon. Illustrative of that is the following example.

EXAMPLE II

To 25 milliliters of pentane, 2.0 grams of a 20% pyrethrum solution in deodorized kerosene (0.4 gram pyrethrum) and 4 grams of piperonyl butoxide were added. The resultant mixture was stirred and then slurried with 14 grams of activated charcoal, G–60, for about ten minutes. The pentane was evaporated under a stream of carbon dioxide and the remaining solids were allowed to air dry completely. Thereafter sufficient pyrophyllite was added to and mixed with the resultant composition to dilute it to 0.2% pyrethrum and 2.0% piperonyl butoxide.

The same test procedure was followed with the composition prepared in accordance with Example II as was described with respect to Example I. It was found that after exposure to ultraviolet light for 24 hours, the composition of Example II killed 100% of the flies exposed to it. By way of comparison a composition of 2% pyrethrum and 10% piperonyl butoxide adsorbed on pyrophyllite in pentane and diluted to 0.2% pyrethrum and 1.0% piperonyl butoxide after 24 hours exposure to ultraviolet light exhibited an effectiveness of only 2%. Both compositions, prior to exposure to ultraviolet light, were 100% effective.

Table II has been prepared in a manner similar to Table I. However it relates to compositions of this invention prepared in pentane solution generally as described in Example II.

grams of Molecular Sieve #4–A for about 10 minutes. Molecular Sieve #4–A is sodium aluminum silicate from which the water of hydration has been driven off and in which the crystal has not collapsed or otherwise rearranged itself. The physical structure of the crystal remains unchanged, therefore, and provides a network of empty pores and cavities which comprise a substantial volume of the crystal. The general formula of sodium aluminum silicate is $Na_2O \cdot Al_2O_3 \cdot SiO_2$. The designation Molecular Sieve #4–A indicates a porous sodium aluminum silicate crystalline composition sold by Linde Company Division of Union Carbide, the designation "4–A" referring to the specific pore size, which in the case of #4–A refers to a pore diameter averaging four (4) Angstrom units.

After the pentane mixture had been thoroughly agitated, the pentane was evaporated and the composition thoroughly air dried. The resultant composition was diluted with pyrophyllite to a final concentration of 0.2% pyrethrum and 2.0% piperonyl butoxide, and then evaluated with female flies in accordance with the test procedure previously described.

It was found that without exposure to ultraviolet light, the composition was 100% effective, and that after exposure to ultraviolet light for 24 hours, the composition retained a 96% effectiveness. However, when a formulation prepared by adsorbing 2.0% pyrethrum and 10% piperonyl butoxide on pyrophyllite in pentane was air dried, was diluted with pyrophyllite to 0.2% pyrethrum and 1.0% piperonyl butoxide, and was exposed to ultraviolet light for 24 hours, it was only 2.0% effective, even though that same formulation when tested without exposure to ultraviolet light was 100% effective.

*Table II*

| Original Proportions Mixed in Pentane, Percent | | | Diluent Used | Final Concentration, Percent | | Effectiveness | |
|---|---|---|---|---|---|---|---|
| Pyrethrum | Piperonyl Butoxide | Charcoal | | Pyrethrum | Piperonyl Butoxide | Hours of Exposure to Ultraviolet Light | Percent Kill After Exposure to Ultraviolet Light |
| 1 | 10 | 85 G | Pyrophyllite | 0.2 | 2.0 | 16 | 88 |
| 2 | 20 | 70 N | do | 0.2 | 2.0 | 16 | 100 |
| 2 | 20 | 70 G | do | 0.2 | 2.0 | 16 | 100 |
| 2 | 20 | 70 G | do | 0.2 | 2.0 | 24 | 100 |
| 2 | 20 | 70 G | do | 0.2 | 2.0 | 48 | 87 |
| 2.5 | 25 | 62.5 N | do | 0.2 | 2.0 | 24 | 98 |
| 5 | 50 | 25 N | do | 0.2 | 2.0 | 16 | 100 |
| 5 | 50 | 25 N | do | 0.2 | 2.0 | 48 | 100 |
| 5 | 50 | 25 N | do | 0.2 | 2.0 | 72 | 100 |
| 5 | 50 | 25 N | do | 0.2 | 2.0 | 96 | 88 |
| 1 | 10 | 85 G | do | 0.1 | 1.0 | 16 | 98 |
| 2 | 20 | 70 N | do | 0.1 | 1.0 | 16 | 75 |
| 2 | 20 | 70 G | do | 0.1 | 1.0 | 16 | 85 |
| 5 | 50 | 25 N | do | 0.1 | 1.0 | 16 | 98 |

Compositions other than piperonyl butoxide and substrates other than charcoal have been found to facilitate the preparation of ultraviolet light resistant pyrethrum compositions of this invention. Such compositions are therefore also within the purview of this invention as hereinafter claimed. Illustrative compositions have been evaluated in the same manner that the compositions of Examples I and II and Tables I and II were evaluated.

An illustrative ultraviolet resistant pyrethrum composition was prepared in a manner exemplified by the following.

EXAMPLE III

To about 25 milliliters of pentane, 2.0 grams of 20% pyrethrum in deodorized kerosene (0.4 gram pyrethrum) and 4.0 grams of piperonyl butoxide were introduced. The resultant mixture was stirred and agitated with 14

Table III has been prepared in a manner similar to Table II. It summarizes the effectiveness of compositions prepared in pentane with porous sodium-aluminum-silicate substrates. Various sodium - aluminum - silicate substrates were used, including Linde Molecular Sieve 5–A (like Sieve 4–A described above but having an average pore diameter of five (5) Angstrom units) and Linde Molecular Sieve X–13 (like Sieve #4–A described above but having an average pore diameter of thirteen (13) Angstrom units). Both are manufactured by Linde Company Division of Union Carbide.

In all cases, prior to exposure to ultraviolet light, the compositions of Table III were 100% effective in accordance with the foregoing test procedure.

Table III

| Original Proportions Mixed In Pentane, Percent | | | Diluent | Final Concentration, Percent | | Effectiveness | |
|---|---|---|---|---|---|---|---|
| Pyrethrum | Piperonyl Butoxide | Sodium Aluminum Silicate (Sieve #) | | Pyrethrum | Piperonyl Butoxide | Hours of Exposure to Ultraviolet Light | Percent Kill After Exposure to Ultraviolet Light |
| 0.2 | 2.0 | 97 (X-13) | None | 0.2 | 2.0 | 24 | 100 |
| 0.2 | 2.0 | 97 (X-13) | do | 0.2 | 2.0 | 48 | 60 |
| 2.0 | 20.0 | 70 (5-8) | Pyrophyllite | 0.2 | 2.0 | 16 | 90 |
| 2.0 | 20.0 | 70 (4-A) | do | 0.2 | 2.0 | 24 | 96 |
| 2.0 | 20.0 | 70 (4-A) | do | 0.1 | 1.0 | 24 | 100 |

Additional compositions have been prepared using ingredients other than piperonyl butoxide, and using porous magnesium silicate, nominally $MgO \cdot SiO_2$, as the substrate.

Exemplary of a process by which such compositions have been made is the following.

EXAMPLE IV

To about 25 milliliters of pentane, 2.0 grams of pyrethrum solution in deodorized kerosene (0.4 grams pyrethrum) and 2.0 grams of Sesoxane were added and then mixed with 16.0 grams of porous magnesium silicate in pentane for about 10 minutes. Thereafter the pentane was volatilized, the composition was dried, was diluted with prophyllite to 0.2% pyrethrum and 1% Sesoxane, and its effectiveness evaluated in accordance with the previously outlined test procedure. The porous magnesium silicate used was Magnesol (a trademark designation of Waverly Chemical Co., Inc.). Magnesol is described as a finely divided, free flowing synthetic magnesium silicate with a highly porous structure, large internal surface and a high surface-to-volume ratio. It is highly adsorptive.

It was found that after 24 hours exposure to ultraviolet light the compositon of Example IV remained 100% effective. A control composition prepared by adsorbing 2.0% pyrethrum and 10% Sesoxane on pyrophyllite in pentane, then drying and diluting with pyrophyllite to 0.2% pyrethrum and 1.0% Sesoxane when tested after exposure to ultraviolet light for 24 hours was without effect, i.e., displayed a 0% kill. However the composition of Example IV and the control composition, when tested without exposure to ultraviolet light were 100% effective.

The results of testing formulations prepared in pentane in generally the same fashion that the composition of Example IV was prepared, are summarized in Table IV. The control results are included in Table IV for ease of comparison. Each control test is marked "Control." Table IV is constructed in a manner similar to Table I.

Table IV

| Original Ingredients Mixed In Pentane, Percent | | | Diluent | Final Concentration, Percent | | Effectiveness | |
|---|---|---|---|---|---|---|---|
| Pyrethrum | Additional Active Ingredient | Substrate | | Pyrethrum | Additional Active Ingredient | Hours of Exposure to Ultraviolet Light | Percent Kill After Exposure to Ultraviolet Light |
| 2 | 10 Piperonyl Butoxide | 80 Magnesium Silicate | Pyrophyllite | 0.2 | 1.0 | 24 | 97. |
| 2 | do | 80 Pyrophyllite | do | 0.2 | 1.0 | 24 | 2 (Control). |
| 2 | do | do | do | 0.2 | 1.0 | None | 100 (Control). |
| 2 | 10 Sesoxane | 80 Magnesium Silicate | do | 0.2 | 1.0 | 24 | 100. |
| 2 | do | 80 Pyrophyllite | do | 0.2 | 1.0 | 24 | 0 (Control). |
| 2 | do | do | do | 0.2 | 1.0 | None | 100 (Control). |
| 2 | 10 Sulfoxide | 80 Magnesium Silicate | do | 0.2 | 1.0 | 24 | 100. |
| 2 | do | 80 Pyrophyllite | do | 0.2 | 1.0 | 24 | 2 (Control). |
| 2 | do | do | do | 0.2 | 1.0 | None | 100 (Control). |
| 2 | 10 MGK-264 | 80 Magnesium Silicate | do | 0.2 | 1.0 | 24 | 23. |
| 2 | 10 MGK-264 | 80 Pyrophyllite | do | 0.2 | 1.0 | 24 | 0 (Control). |
| 2 | 10 MGK-264 | do | do | 0.2 | 1.0 | None | 100 (Control). |

The foregoing compositions specified in the examples and in the tables are exemplary of the compositions contemplated by this invention and illustrate the peculiar effectiveness of the pyrethrum containing ultraviolet resistant compositions of this invention. So also are the specific methods whereby those compositions were made illustrative only of the methods of this invention. They are intended, however, to be merely illustrative and not to be limiting upon this invention.

What is claimed is:

1. An ultraviolet light resistant pyrethrum insecticidal composition comprising
   (A) as its active ingredient from about 10% to about 20% by weight of pyrethrum and from about 90% to about 80% by weight of a member selected from the group consisting of piperonyl butoxide, 2-(3,4-methylene dioxy phenoxy)-3,6,9-trioxaundecane, n-octylsulfoxide of isosafrol, and N-octyl bicycloheptene dicarboximide and (B) activated charcoal upon which said active ingredient has been adsorbed.

2. The ultraviolet light resistant pyrethrum insecticidal composition of claim 1 wherein the member selected from the group is piperonyl butoxide.

3. The ultraviolet light resistant pyrethrum insecticidal composition of claim 1 wherein the member selected from the group is 2-(3,4-methylene dioxy phenoxy)-3,6,9-trioxaundecane.

4. The ultraviolet light resistant pyrethrum insecticidal composition of claim 1 wherein the member selected from the group is n-octylsulfoxide of isosafrol.

5. The ultraviolet light resistant pyrethrum insecticidal composition of claim 1 wherein the member selected from the group is N-octyl bicycloheptene dicarboximide.

References Cited by the Examiner

UNITED STATES PATENTS

| | | | |
|---|---|---|---|
| 3,042,706 | 7/1962 | Hans et al. | 167—24 |
| 3,055,800 | 9/1962 | Willmore et al. | 167—24 |
| 3,186,903 | 6/1965 | Soltes | 167—24 |

OTHER REFERENCES

J. Sci. Food Agr., vol. 9, October 1958, pp. 666–672.

Soap and Sanitary Chemicals, July 1952, p. 136.

JULIAN S. LEVITT, *Primary Examiner.*

FRANK CACCIAPAGLIA, JR., *Examiner.*

GEORGE A. MENTIS, *Assistant Examiner.*